(12) United States Patent
Bunger et al.

(10) Patent No.: US 6,376,005 B2
(45) Date of Patent: *Apr. 23, 2002

(54) ANTIMICROBIAL COMPOSITION FOR FOOD AND BEVERAGE PRODUCTS

(75) Inventors: John Robert Bunger, Hebron, KY (US); Athula Ekanayake, Cincinnati, OH (US)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/291,888

(22) Filed: Apr. 14, 1999

Related U.S. Application Data

(62) Division of application No. 08/843,088, filed on Apr. 25, 1997, now Pat. No. 6,132,787.

(51) Int. Cl.[7] .............................. A23F 3/00; A23L 2/44
(52) U.S. Cl. .................................... 426/597; 426/330.3
(58) Field of Search ................................ 426/335, 422, 426/435, 648, 655, 597, 330.3, 590

(56) References Cited

U.S. PATENT DOCUMENTS

| | | | |
|---|---|---|---|
| 2,910,400 A | | 10/1959 | Bernhard et al. |
| 3,655,719 A | | 4/1972 | Anderson et al. |
| 3,892,850 A | | 7/1975 | Struyk et al. ................ 424/119 |
| 3,936,269 A | * | 2/1976 | Bayne ........................... 21/58 |
| 3,996,386 A | * | 12/1976 | Malkki et al. .............. 426/321 |
| 4,039,689 A | | 8/1977 | Bone et al. ................... 426/99 |
| 4,087,543 A | | 5/1978 | Pauli et al. ................. 424/301 |
| 4,536,494 A | | 8/1985 | Carter ......................... 514/31 |
| 4,600,706 A | | 7/1986 | Carter ......................... 514/31 |
| 4,664,861 A | | 5/1987 | Pritikin et al. ............. 264/173 |
| 4,797,293 A | * | 1/1989 | Evans et al. ................ 426/330 |
| 4,929,748 A | | 5/1990 | Franklin ..................... 558/276 |
| 4,935,256 A | * | 6/1990 | Tsai ......................... 426/330.3 |
| 5,214,185 A | | 5/1993 | Nishihara et al. .......... 558/277 |
| 5,229,372 A | | 7/1993 | King ............................ 514/31 |
| 5,231,211 A | | 7/1993 | Tang .......................... 558/276 |
| 5,281,743 A | | 1/1994 | Franklin ..................... 558/276 |
| 5,464,619 A | * | 11/1995 | Kuznciki et al. ........ 424/195.1 |
| 5,597,598 A | * | 1/1997 | Van Rijn et al. .......... 426/310 |
| 5,738,888 A | * | 4/1998 | Cirigiliano et al. .......... 426/52 |
| 5,866,182 A | * | 2/1999 | Exner et al. ............. 426/330.3 |
| 5,895,681 A | | 4/1999 | Cirigliano et al. ....... 426/330.3 |

FOREIGN PATENT DOCUMENTS

| | | |
|---|---|---|
| CA | 2008891 | 7/1991 |
| EP | 0 513 922 | 12/1992 |
| JP | 06-116258 | * 4/1994 |
| WO | 96/09774 | 4/1996 |
| ZA | 87242502 | 10/1986 |

OTHER PUBLICATIONS

Shirk and Clark, The Effect of Pimaricin in Retarding the Spoilage of Fresh Orange Juice., Food Technology, p. 108–112, Aug. 1963.*

Gourma et al.; Effects of Potassium Sorbate and Natamycin on Growth and Penicillic Acid Production by Aspergillus Ochraceus; Journal of Food Protection; vol. 51, No. 2; pp. 139–144.

Azzouz et al.; Comparative Antimycotic Effects of Selected Herbs, Spices, Plant Components and Commercial Antifungal Agents; Journal of Food Protection; vol. 45; No. 14; pp. 1298–1301.

Richard A. Holley; Prevention of Surface Mold Growth on Italian Dry Sausage by Natamycin an Potassium Sorbate; Applied and Environmental Microbiology; Feb. 1981; pp. 422–429.

Shirk et al.; The Effect of Pimaricin in Retarding the Spoilage of Fresh Orange Juice; Food Technology; Aug. 1963; pp. 108–112.

Ruig et al.; Influence of the fungicides sorbate and natamycin in cheese coatings on the quality of the cheese; Netherlands Milk Dairy Journal 39;1985; pp. 165–172.

Cole et al.; Probability of growth of the spoilage yeast Zygosaccharomyces baili in a model drink system; Food Microbiology; Apr. 1987; pp. 114–119.

Alan D. Warth; Transport of Benzoic and Propanioc Acids by Zygosaccharomyces baili;Journal of General Microbiology; vol. 135; 1989; pp. 1383–1390.

* cited by examiner

Primary Examiner—Arthur L. Corbin
(74) Attorney, Agent, or Firm—Kelly McDow-Dunham; Carl J. Roof

(57) ABSTRACT

Antimicrobial combinations comprising a sorbate preservative, natamycin and a dialkyl dicarbonate at levels below the taste threshold for each of these antimicrobials but such that combination is effective against food spoilage microorganisms. These antimicrobial combinations are useful in treating beverages, especially dilute juice beverages, calcium fortified beverages, beverages containing tea solids, and beverages containing milk solids and proteins, as well as other acidified, high water activity food and beverage products such as cheese, sausage, ready-to-spread frostings, salad dressings, mayonnaise, and the like, that are susceptible to food spoilage microorganisms, including yeasts such as *Zygosaccharomyces bailii*.

10 Claims, No Drawings

ANTIMICROBIAL COMPOSITION FOR FOOD AND BEVERAGE PRODUCTS

CROSS-REFERENCE TO RELATED APPLICATION

The present application is a division of U.S. patent application Ser. No. 08/843,088, filed Apr. 25, 1997, now U.S. Pat. No. 6,132.787.

TECHNICAL FIELD

This application relates to antimicrobial combinations useful in beverages, especially dilute juice beverages, calcium fortified beverages, beverages containing tea solids and beverages containing milk solids and proteins, as well as other food products susceptible to food spoilage microorganisms. This application particularly relates to synergistic antimicrobial combinations that can be formulated from existing preservatives at a suboptimal levels so as not to impart off-flavors.

BACKGROUND OF THE INVENTION

Dilute juice beverage products are well known in the art. One component that is desirably present in dilute juice beverages that are intended to be stored without refrigeration (e.g., at ambient temperatures) is an antimicrobial preservative. Dilute juice beverages, when exposed to food spoilage microorganisms, can provide a hospitable environment for rapid microbial growth. Such exposure can, and infrequently does, result from accidental inoculation of the dilute juice beverage with these microorganisms during manufacturing or packaging. Food spoilage microorganisms can then rapidly proliferate by feeding on nutrients provided by the juice component of the dilute juice beverage.

Preservatives, such as sorbates, benzoates, organic acids, and combinations thereof have been used in dilute juice beverages to provide some degree of microbial inhibition. At levels effective to inhibit microbial growth, some of these preservatives can contribute off-flavors to dilute juice beverages. For example, accepted usage levels for potassium sorbate can be in the range of from about 200 to about 3000 ppm. Typically, potassium sorbate is included in dilute juice beverages at levels far above the effective minimum to ensure antimicrobial activity. However, at the higher end of this accepted usage range, potassium sorbate can contribute off-flavors to dilute juice beverages.

In addition, potassium sorbate is not effective against certain yeasts that can be present in beverage processing plants. Of particular concern is *Zygosaccharomyces bailii*. *Zygosaccharomyces bailii* is a common food spoilage yeast that is extremely resistant to weak acid preservatives such as potassium sorbate, tolerating in some cases preservative concentrations well in excess of those permitted legally. See Cole et al, "Probability of Growth of the Spoilage Yeast *Zygosaccharomyces bailii* in a Model Fruit Drink System," *Food Microbiology*, 1987, 4, pp. 115–19. See also Warth, "Transport of Benzoic and Propanoic Acids by *Zygosaccharomyces bailii,*" *Journal of General Microbiology*, 1989, 135, pp. 1383–90 (*Zygosaccharomyces bailii* very tolerant of common weak-acid-type preservatives, including sorbic acids). This yeast can enter the beverage plant by means of unpasteurized or recontaminated chemically preserved fruit juice and then establish itself in various portions of the plant's equipment, leading to further contamination and spoilage.

Yeast and mold inhibitors such as natamycin have been found to be particularly effective against yeasts such as *Zygosaccharomyces bailii*. See Shirk & Clark, "The Effect of Pimaricin in Retarding the Spoilage of Fresh Orange Juice," *Food Technology*, 1963, p 108. Natamycin is also effective against a variety of other saprophytic and parasitic fungi and yeasts. See U.S. Pat. No. 3,892,850 (Struyk), issued Jul. 1, 1975. However, natamycin, when in solution, is rather unstable. Inactivation of natamycin by light, peroxides or oxygen proceeds at the fastest rate in solution or suspension. For example, an aqueous solution of 6 mcg/ml of natamycin becomes microbiologically inactive after twenty-four hour exposure to light. Natamycin is also sensitive to heavy metals, and can lose up to 75% of its effectiveness in four or five hours in the presence of these heavy metals. In addition, natamycin is not effective against bacteria. See U.S. Pat. No. 4,536,494 (Carter), issued Aug. 20, 1985.

Dialkyl dicarbonates have also been used or suggested for use as yeast inhibitors in wine, ready-to-drink teas, fruit juices, vegetable products, pharmaceutical products, beer and the like. See 37 CFR §172.133. See also U.S. Pat. No. 3,979,524 (Bayne), issued Sep. 7, 1976 and U.S. Pat. No. 2,910,400 (Berhard et al), issued Oct. 27, 1959(also referred to as "pyrocarbonic acid esters"). Dialkyl dicarbonates provide a very effective initial "kill" of any microorganisms in the just formulated single strength beverage. However, the dialkyl dicarbonate is rapidly hydrolyzed by aqueous systems such as dilute juice beverages shortly after addition. As the concentration of dialkyl dicarbonate decreases, it soon becomes ineffective to kill microorganisms that might be introduced later during processing into the beverage. See Ough, "Dimethyldicarbonate and Diethyldicarbonate" *Antimicrobials in Foods*, 193, Marcel Dekker, pp. 343–368.

It has been recently suggested that the use certain food grade polyphosphates especially sodium hexametaphosphate, can enhance the potency of preservatives, such as potassium sorbate, when the preservative is used at lower levels in dilute juice beverages. See U.S. Pat. No. 5,431,940 (Calderas), issued Jul. 11, 1995, which discloses the use of polyphosphates, such as sodium hexametaphosphate, with sorbate preservatives, such as potassium sorbate, in dilute juice beverages having relatively low water hardness. However, inclusion of these polyphosphates can present problems in beverages fortified with calcium or containing proteins, especially milk proteins such as the caseins and albumins. The inclusion of polyphosphates at levels sufficient to potentiate the preservative will also sequester any calcium and milk proteins present and precipitate out the resulting complexes.

Even when preservatives such as potassium sorbate are included, dilute juice beverages can still require refrigeration to maintain microbial stability. Refrigerated beverages require special handling, especially in terms of shelf space in the store. This also necessitates more expensive refrigeration trucks and railroad cars in transporting these beverages to the stores.

Accordingly, it would be desirable to be able to provide dilute juice beverages that: (1) use preservative systems that can be formulated with existing antimicrobials such as potassium sorbate; (2) are stable against microbial growth at ambient temperatures, including yeasts such as *Zygosaccharomyces bailii*; (3) do not have off-flavors contributed by the preservative system; (4) can be fortified with calcium; (5) can include milk solids; (6) do not require special handling, especially refrigeration, during transportation and storage.

DISCLOSURE OF THE INVENTION

The present invention relates to antimicrobial combinations useful in treating beverages, especially dilute juice beverages, calcium fortified beverages, beverages containing tea solids, and beverages containing milk solids and proteins, as well as other acidified (i.e., pH less than about 4.6), high water activity (i.e., greater than about 0.85 $a_w$) food and beverage products such as cheese, sausage, ready-to-spread frostings, salad dressings, mayonnaise, and the like, that are susceptible to food spoilage microorganisms. The antimicrobial combinations of the present invention comprise natamycin, dialkyl dicarbonate and a sorbate preservative. Food products are treated with these antimicrobial combinations such that the natamycin, dialkyl dicarbonate and a sorbate preservative are at levels below the taste threshold for each of these antimicrobials but at levels sufficient such that the combination is effective against food spoilage microorganisms.

The present invention further relates to a preferred process for treating beverages normally susceptible to food spoilage microorganisms with these antimicrobial combinations. This process comprises the steps of:

(a) forming a beverage concentrate comprising:
  (1) a concentrate of a beverage normally susceptible to food spoilage microorganism;
  (2) natamycin in an amount sufficient to provide from about 2 to about 10 ppm thereof in a single strength beverage; and
  (3) a sorbate preservative in an amount sufficient to provide from about 30 to about 300 ppm thereof in a single strength beverage;
(b) adding a source of water to the beverage concentrate in an amount sufficient to provide a single strength beverage;
(c) substantially uniformly dispersing a dialkyl dicarbonate in the single strength beverage in an amount sufficient to provide from about 30 to about 150 ppm thereof.

Beverages, including dilute juice beverages, beverages containing tea solids, and beverages containing milk solids, treated with these antimicrobial combinations are stable against microbial growth at ambient temperatures and are especially resistant to the growth of common food spoilage yeasts, including Zygosaccharomyces bailii. Because the various components of the antimicrobial combination are be present at levels below their taste threshold, off-flavors are not contributed by this antimicrobial combination. Beverages treated with this antimicrobial combination can also be formulated with calcium or other nutrient minerals, as well as milk solids. Beverages, especially dilute juice beverages, treated with this antimicrobial combination also do not require refrigeration during transportation and storage.

DETAILED DESCRIPTION OF THE INVENTION

A. Definitions

As used herein, "microbial proliferation" means a 100 fold increase or greater in the number of beverage spoilage microorganisms in a beverage after an initial contamination level of about 10 cfu/ml.

As used herein, "ambient display time" means the period of time during which a beverage product at 68° F. (20° C.) can effectively resist microbial proliferation following a 10 cfu/ml contamination with beverage spoilage microorganisms.

As used herein, the term "comprising" means various components and processing steps can be conjointly employed in the antimicrobial combinations, products and processes of the present invention. Accordingly, the term "comprising" encompasses the more restrictive terms "consisting essentially of" and "consisting of."

All amounts, parts ratios and percentages used herein are by weight unless otherwise specified.

B. Antimicrobial Combinations

The antimicrobial combinations useful in the present invention comprise a combination of natamycin, a dialkyl dicarbonate and a sorbate preservative. Each of the components in these antimicrobial combinations are present at levels below the taste threshold of the respective antimicrobial. This avoids off-flavors being imparted to the food product treated with these antimicrobial combinations. Levels of these antimicrobial below the taste threshold are also typically suboptimal levels, i.e., levels below the normally optimal effect range for the given antimicrobial. However, it has been surprisingly found that the combination of these three components together can be synergistic such that the combination is effective against microbial growth in a variety of food products susceptible to food spoilage microorganisms, including yeasts such as Zygosaccharomyces bailii.

To provide resistance to microbial growth, food products are typically treated with:

(a) from about 2 to about 10 ppm, preferably from about 2.5 to about 5 ppm, natamycin;
(b) from about 30 to about 150 ppm, preferably from about 50 to about 100 ppm, dialkyl dicarbonate;
(c) from about 30 to about 300 ppm, preferably from about 50 to about 150 ppm, sorbate preservative.

The natamycin suitable for use in the present invention is a known and commercially available yeast and mold inhibitor that has been used to prevent the growth of yeasts and molds in various food products, such cheese, sausage, juices, etc. Natamycin is particularly effective against yeasts such as Zygosaccharomyces bailii. Natamycin is produced by Streptomyces natalensis and by S. chattanoogensis and is often referred to by other names such as pimaricin, antibiotic A 5283, tennecetin, CL 12625, Mycophyt, Myprozine, Natacyn and Pimafucin, all of which are collectively referred to as "natamycin" for the purposes of the present invention. Natamycin useful in the present invention also includes any compounds having substantially the same chemical structure as natamycin, e.g., compounds produced by chemical synthesis or biotechnology, provided such compounds have essentially the same mold and yeast inhibition properties. Natamycin is available from a number of companies under various trademarks, e.g., from Gist-Brocades Food Ingredients, Inc. of King of Prussia, Pa., under the trademark DELVOCID® and from Cultor Food Science Inc., Roseville, Calif. under the trademark NATAMAX®. See U.S. Pat. No. 892,850 (Struyk et al), issued Jul. 1, 1975 (herein incorporated by reference), which describes the preparation of natamycin (pimaricin) by culturing Streptomyces natalensis. See also The Merck Index (Twelfth Edition 1996), page 967, entry 6519, for further details on natamycin and its preparation.

Dialkyl dicarbonates (also referred to as "pyrocarbonic acid esters") suitable for use in the present invention have been used or suggested for use as yeast inhibitors in wine, ready-to-drink teas, fruit juices, vegetable products, pharmaceutical products, beer and the like. See U.S. Pat. No. 3,936,269 (Bayne), issued Feb. 3, 1976 and U.S. Pat. No. 3,972,524 (Bayne), issued Sep. 7, 1976. These dialkyl dicarbonates have the following general formula:

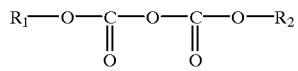

where $R_1$ and $R_2$ represent the same or a different alkyl group such as methyl, ethyl, propyl, isopropyl, butyl, isobutyl, amyl, cyclohexyl, etc. See U.S. Pat. No. 2,910,400 (Koln-Stammheim et al), issued Oct. 27, 1959, which is incorporated by reference. The preferred dialkyl carbonate for use in the present invention is dimethyl dicarbonate. See also U.S. Pat. No. 4,929,748 (Franklin), issued May 29, 1990; U.S. Pat. No. 5,214,185 (Nishihira et al), issued May 25, 1993; and U.S. Pat. No. 5,231,211 (Tang), issued Jul. 27, 1993 (herein incorporated by reference) for methods for making dialkyl carbonates, including dimethyl dicarbonate.

Sorbate preservatives suitable for use in the present invention include sorbic acid, as well as the salts of sorbic acid such calcium sorbate, sodium sorbate, potassium sorbate and mixtures thereof. Potassium sorbate is particularly preferred for use in the present invention, especially for dilute juice beverages and other beverages products requiring good water solubility.

C. Food and Beverage Products Treated With Antimicrobial Combinations

The antimicrobial combinations of the present invention can be used to treat a wide variety of food and beverage products susceptible to food spoilage microorganisms. These food and beverage products include dairy products such as cheese, milk, sour cream, yogurt, butter, margarine, ice cream, food and beverage products containing dairy or milk solids and proteins such as salad dressings, creamers, ready-to-spread frosting products, mayonnaise, wines, juices, purees, processed meat products such as sausages, hot dogs, and uncooked fermented manufactured meat products, and other acidified (i.e., pH less than about 4.6), high water activity (i.e., greater than about 0.85 $a_w$) food and beverage products. These antimicrobial combinations are particularly useful beverage products, especially dilute juice beverages, calcium fortified beverages, beverages containing tea solids and beverages containing milk solids and proteins.

Dilute juice beverages of the present invention typically comprise from about 0.2 to about 5%, preferably from about 0.5 to about 3%, most preferably from about 0.8 to about 2%, of a beverage emulsion. This beverage emulsion can be either a cloud emulsion or a flavor emulsion.

For cloud emulsions, the clouding agent can comprise one or more fats or oils stabilized as an oil-in-water emulsion using a suitable food grade emulsifier. Any of a variety of fats or oils can be employed as the clouding agent, provided that the fat or oil is suitable for use in foods and beverages. Preferred are those fats and oils that have been refined, bleached and deodorized to remove off-flavors. Especially suitable for use as clouding agents are those fats that are organoleptically neutral. These include fats from the following sources: vegetable fats such as soybean, corn, safflower, sunflower, cottonseed, canola, and rapeseed; nut fats such as coconut, palm, and palm kernel; and synthetic fats. See U.S. Pat. No. 4,705,691 (Kupper, et al), issued Nov. 10, 1987 (herein incorporated by reference) for suitable fat or oil clouding agents.

Any suitable food grade emulsifier can be used that can stabilize the fat or oil clouding agent as an oil-in-water emulsion. Suitable emulsifiers include gum acacia, modified food starches (e.g., alkenylsuccinate modified food starches), anionic polymers derived from cellulose (e.g., carboxymethylcellulose), gum ghatti, modified gum ghatti, xanthan gum, tragacanth gum, guar gum, locust bean gum, pectin, and mixtures thereof. See U.S. Pat. No. 4,705,691 (Kupper, et al), issued Nov. 10, 1987, which is incorporated by reference. Modified starches treated so they contain hydrophobic as well as hydrophilic groups, such as those described in U.S. Pat. No. 2,661,349 (Caldwell et al) (herein incorporated by reference), are preferred emulsifiers for use as herein. Octenyl succinate (OCS) modified starches such as those described in U.S. Pat. No. 3,455,838 (Marotta et al.), and U.S. Pat. No. 4,460,617 (Barndt et al.), (herein incorporated by reference), are especially preferred emulsifiers.

The clouding agent can be combined with a weighting agent to provide a beverage opacifier that imparts a total or partial opaque effect to the beverage without separating out and rising to the top. The beverage opacifier provides the appearance to the consumer of a juice-containing beverage. Any suitable weighting oil can be employed in the beverage opacifier. Typical weighting oils include brominated vegetable oil, glycerol ester of wood rosin (ester gum), sucrose acetate isobutyrate (SAIB) and other sucrose esters, gum damar, colophony, gum elemi, or others known to those skilled in the art. Other suitable weighting agents include brominated liquid polyol polyesters that are nondigestible. See U.S. Pat. No. 4,705,690 (Brand et al), issued Nov. 10, 1987, which is incorporated by reference.

The cloud/opacifier emulsion is prepared by mixing the clouding agent with the weighting agent (for opacifier emulsions), the emulsifier and water. The emulsion typically contains from about 0.1 to about 25% clouding agent, from about 1 to about 20% weighting oil agent (in the case of opacifier emulsions), from about 1 to about 30% emulsifiers, and from about 25 to about 97.9% water, quantum satis.

The particle size of the water-insoluble components of the emulsion is reduced by employing a suitable apparatus known in the art. Because the ability of emulsifying agents to hold oil in suspension is proportional to particle size, emulsions of particles with diameters of about 0.1 to about 3.0 microns are suitable. Preferably, the particles are about 2.0 microns or less in diameter. Most preferred is an emulsion in which substantially all the particles are 1.0 microns or less in diameter. The particle size is reduced by passing the mixture through an homogenizer, colloid mill or turbine-type agitator. Usually one or two passes is sufficient. See U.S. Pat. No. 4,705,691 (Kupper, et al), issued Nov. 10, 1987, which is incorporated by reference.

Flavor emulsions useful in the beverages comprise one or more suitable flavor oils, extracts, oleoresins, essential oils and the like, known in the art for use as flavorants in beverages. This component can also comprise flavor concentrates such as those derived from concentration of natural products such as fruits. Terpeneless citrus oils and essences can also be used herein. Examples of suitable flavors include fruit flavors such as orange, lemon, lime and the like, cola flavors, tea flavors, coffee flavors, chocolate flavors, dairy flavors, and others. These flavors can be derived from natural sources such as essential oils and extracts, or can be synthetically prepared. The flavor emulsion typically comprises a blend of various flavors and can be employed in the form of an emulsion, alcoholic extract, or spray dried. The flavor emulsion can also include clouding agents, with or without weighting agents, as previously described. See U.S. Pat. No. 4,705,691 (Kupper, et al), issued Nov. 10, 1987, which is incorporated by reference.

Flavor emulsions are typically prepared in the same manner as cloud/opacifier emulsions by mixing flavoring oils (0.001 to 20%) with an emulsifying agent (1 to 30%) and water. (The oil clouding agents can also be present.) Emulsions of particles with diameters of from about 0.1 to about 3.0 microns are suitable. Preferably, the particles are about 2.0 microns or less in diameter. Most preferably, the particles are about 1.0 microns or less in diameter. The emulsifying agent coats the particularized flavor oil to aid in preventing coalescence and in maintaining an appropriate dispersion. The viscosity and specific gravity of the flavor emulsion are regulated to be compatible with the finished beverage. See U.S. Pat. No. 4,705,691 (Kupper, et al), issued Nov. 10, 1987, which is incorporated by reference:

The dilute juice beverages of the present invention optionally but preferably comprise flavor solids selected from fruit juice, tea solids and mixtures of fruit juice and tea solids. When fruit juice is included, the beverages of the present invention can comprise from 0.1 to about 40%, preferably from 1 to about 20%, more preferably from about 2 to about 10%, most preferably from about 3 to about 6%, fruit juice. (As measured herein, the weight percentage of fruit juice is based on a single strength 2° to 16° Brix fruit juice.) The fruit juice can be incorporated into the beverage as a puree, comminute or as a single strength or concentrated juice. Especially preferred is the incorporation of the fruit juice as a concentrate with a solids content (primarily as sugar solids) of from about 20° to about 80° Brix.

The fruit juice can be any citrus juice, non-citrus juice, or mixture thereof, which are known for use in dilute juice beverages. The juice can be derived from apple, cranberry, pear, peach, plum, apricot, nectarine, grape, cherry, currant, raspberry, gooseberry, elderberry, blackberry, blueberry, strawberry, lemon, lime, mandarin, orange, grapefruit, cupuacu, potato, tomato, lettuce, celery, spinach, cabbage, watercress, dandelion, rhubarb, carrot, beet, cucumber, pineapple, coconut, pomegranate, kiwi, mango, papaya, banana, watermelon, tangerine and cantaloupe. Preferred juices are derived from apple, pear, lemon, lime, mandarin, grapefruit, cranberry, orange, strawberry, tangerine, grape, kiwi, pineapple, passion fruit, mango, guava, raspberry and cherry. Citrus juices, preferably grapefruit, orange, lemon, lime, and mandarin juices, as well as juices derived from mango, apple, passion fruit and guava, as well as mixtures of these juices are most preferred.

When tea solids are included, the beverages of the present invention can comprise from about 0.01 to about 1.2%, preferably from about 0.05 to about 0.8%, by weight of tea solids. The term "tea solids" as used herein means solids extracted from tea materials including those materials obtained from the genus Camellia including *C. sinensis* and *C. assaimica*, for instance, freshly gathered tea leaves, fresh green tea leaves that are dried immediately after gathering, fresh green tea leaves that have been heat treated before drying to inactivate any enzymes present, unfermented tea, instant green tea and partially fermented tea leaves. Green tea materials are tea leaves, tea plant stems and other plant materials that are related and which have not undergone substantial fermentation to create black teas. Members of the genus Phyllanthus, catechu gambir and Uncaria family of tea plants can also be used. Mixtures of unfermented and partially fermented teas can be used.

Tea solids for use in beverages of the present invention can be obtained by known and conventional tea solid extraction methods. A particularly preferred source of green tea solids can be obtained by the method described in copending U.S. application Ser. No. 08/606,907 (Ekanayake et al), filed Feb. 26, 1996, now U.S. Pat. No. 6,063,428, which is incorporated by reference. Tea solids so obtained will typically comprise caffeine, theobrormine, proteins, amino acids, minerals and carbohydrates. Suitable beverages containing tea solids can be formulated according to U.S. Pat. No. 4,946,701 (Tsai et al), issued Aug. 7, 1990, which is incorporated by reference. See also U.S. Pat. No. 5,427,806 (Ekanayake et al) issued Jun. 26, 1995, for a suitable sources of green tea solids for use in the present invention.

Beverages according to the present invention can also be formulated to contain milk solids. These milk solids can be derived from various sources including whole milk, skim milk, condensed milk, and dried milk powder. As used herein, the term "milk" will be used to describe an aqueous dispersion of milk solids, such as fluid (whole or skim milk) or non-fat dry milk or condensed milk diluted with water. The amount of milk included is typically range from about 5 to about 99.8%, preferably from about 5 to about 75%, more preferably from about 5 to about 40%, and most preferably from about 5 to about 15%. (The amount of non-fat milk solids correlating to these levels of milk solids is in the range of from about 0.5 to about 8.2%, from about 0.5 to about 6.2%, from about 0.5 to about 3.3%, and from about 0.5 to 1.2% of the beverage, respectively.)

Beverages according to the present invention, especially dilute juice beverage and tea solids containing beverages can comprise thickeners, including xanthan gum, carboxymethylcellulose, propylene glycol alginate, gellan gum, guar gum, pectin, tragacanth gum, gum acacia, locust bean gum, gum arabic, gelatin, as well as mixtures of these thickeners. These thickeners are typically included in the beverages of the present invention at levels up to about 0.07%, depending on the particular thickener involved and the viscosity effects desired.

The beverages of the present invention can, and typically will, contain an effective amount of one or more sweeteners, including carbohydrate sweeteners and natural and/or artificial no/low calorie sweeteners. The amount of the sweetener used (i.e., "effective amount") in the beverages of the present invention typically depends upon the particular sweetener used and the sweetness intensity desired. For no/low calorie sweeteners, this amount varies depending upon the sweetness intensity of the particular sweetener.

The beverages of the present invention can be sweetened with any of the carbohydrate sweeteners, preferably mono- and or di-saccharide sugars. Sugar sweetened beverages will typically comprise from about 0.1 to about 20%, most preferably from about 6 to about 14%, sugar. These sugars can be incorporated into the beverages in solid or liquid form but are typically, and preferably, incorporated as a syrup, most preferably as a concentrated syrup such as high fructose corn syrup. For purposes of preparing beverages of the present invention, these sugar sweeteners can be provided to some extent by other components of the beverage such as the fruit juice component, flavorants, and so forth.

Preferred sugar sweeteners for use in these beverages are sucrose, fructose, glucose, and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein as fructose. Other naturally occurring sweeteners or their purified extracts, such as glycyrrhizin, the protein sweetener thaumatin, the juice of Luo Han Guo disclosed in, for example, U.S. Pat. No. 5,433,965 (Fischer et al), issued Jul. 18, 1995 (herein incorporated by reference), and the like can also be used in the beverages of the present invention.

Suitable no/low calorie sweeteners include saccharin, cyclamates, acesulfam K (Sunette™), L-aspartyl-L-phenylalanine lower alkyl ester sweeteners (e.g., aspartame); L-aspartyl-D-alanine amides disclosed in U.S. Pat. No. 4,411,925 to Brennan et al.; L-aspartyl-D-serine amides disclosed in U.S. Pat. No. 4,399,163 to Brennan et al.; L-aspartyl-L-1-hydroxymethylalkaneamide sweeteners disclosed in U.S. Pat. No. 4,338,346 to Brand; L-aspartyl-1-hydroxyethyalkaneamide sweeteners disclosed in U.S. Pat. No. 4,423,029 to Rizzi; and L-aspartyl-D-phenylglycine ester and amide sweeteners disclosed in European Patent Application 168,112 to J. M. Janusz, published Jan. 15, 1986; and the like and mixtures thereof. A particularly preferred low calorie sweetener is aspartame.

The beverages of the present invention can comprise other optional beverage ingredients, including other preservatives (e.g., organic acids), colorants and so forth. These beverages can also be fortified with from 0 to about 110% of the U.S. Recommended Daily Allowance (RDA) of vitamins and minerals, provided that such vitamins and minerals do not substantially alter the desired properties of the beverage (e.g., ambient display times), and that such vitamins and minerals are chemically and physically compatible with the other essential components of beverage. Especially preferred are vitamin A (e.g., vitamin A palmitate), provitamins thereof (e.g., β-carotene), vitamin B1 (e.g., thiamin HCl) and vitamin C (i.e., ascorbic acid), although it is understood that other vitamins.

Minerals that can be included in beverages of the present invention include calcium, magnesium, zinc, iodine, and copper. Any soluble salt of these minerals suitable for inclusion edible products can be used, for example, calcium carbonate, calcium citrate, calcium malate, calcium-citrate-malate, calcium gluconate, magnesium citrate, magnesium gluconate, magnesium sulfate, zinc chloride, zinc sulfate, potassium iodide, and copper sulfate. A preferred source of calcium is a complex with certain organic acids, and in particular calcium citrate-malate. The preparation of this preferred calcium organic acid complex is described in U.S. Pat. No. 4,737,375 (Nakel et al), issued Apr. 12, 1988, which is incorporated by reference.

The beverages of the present invention typically have a pH of from about 2 to about 4.5, preferably from about 2.7 to about 4.2. This pH range is typical for noncarbonated beverages. Beverage acidity can be adjusted to and maintained within the requisite range by known and conventional methods, e.g., the use of food grade acid buffers. Typically, beverage acidity within the above recited ranges is a balance between maximum acidity for microbial inhibition and optimum acidity for the desired beverage flavor and sourness impression.

The beverages of the present invention can be prepared by conventional methods for formulating noncarbonated beverages. Methods for making dilute juice beverages, for example, are described in U.S. Pat. No. 4,737,375 (Nakel et al), issued Apr. 12, 1988, which is incorporated herein by reference. Methods for making beverage products are also described by Woodroof and Phillips, *Beverages: Carbonated & Noncarbonated*, AVI Publishing Co. (rev. ed. 1981); and by Thomer and Herzberg, *Non-alcoholic Food Service Beverage Handbook*, AVI Publishing Co. (2nd ed. 1978). Such methods can include hot packing or aseptic packaging operations, although such operations are not necessary for achieving either beverage stability or extended ambient display times. Indeed, the advantage of the synergistic antimicrobial combination of the present invention is that beverages containing this combination can be made without hot packing the product.

Any method that insures the antimicrobial combination is incorporated into the food or beverage such that any microorganisms present are effectively killed or their growth is inhibited is suitable. A preferred method for making dilute juice beverages according to the present invention is as follows: The sorbate preservative and natamycin are added to a juice concentrate used to formulate the beverage in amounts sufficient to provide the above indicated levels of these antimicrobials in the single strength dilute juice beverage. The juice concentrate with these antimicrobial components is then mixed, blended or otherwise combined with a source of water at the appropriate ratio to provide a single strength dilute juice beverage. Once the single strength dilute juice beverage is prepared, the dialkyl dicarbonate is then added and is preferably substantially uniformly dispersed in the beverage. The dialkyl dicarbonate provides a very effective initial "kill" of any microorganisms in the single strength beverage just after it is formulated. As the dialkyl dicarbonate is hydrolyzed by the water, the sorbate preservative and natamycin present insure an effective inhibition of microbial growth over time.

E. Test Method: Ambient Display Times/Microbial Stability

Ambient display times correspond to the time period during which a food product, such as a beverage product at 68° F. (20° C.) can effectively resist microbial proliferation following a 10 cfu/ml inoculation with food spoilage microorganisms. The term "microbial proliferation" as used herein means a 100 fold increase or greater in the number of food spoilage microorganisms in a food product, after an initial inoculation level of about 10 cfu/ml.

Ambient display times for food products can be determined by the following method. Food products are inoculated with mixed groups of preservative resistant yeast containing at least four separate yeast isolates, including *Zygosaccharomyces bailii*, and with mixed groups of preservative resistant, acid tolerant bacteria, including *Acetobacter* species. All yeast and bacteria utilized in the inoculation are previously isolated from preserved fruit juice beverages. Inoculated food products are maintained at 68° F. (20° C.) for 21 days and aerobic plate cultures performed periodically. Aerobic plate counts of both yeast and bacteria populations are performed as described in the Compendium of Methods for the Microbiological Examinations of Foods, American Public Health Association, Washington, D.C. (edited by C. Vanderzant and D. F. Splittstoesser), which description is incorporated herein by reference. These plate counts are then used to identify the degree of microbial proliferation in the inoculated beverage.

EXAMPLES

The following are illustrative of beverages prepared using the synergistic antimicrobial combination of the present invention.

Example 1

A juice milk beverage is prepared from the following ingredients:

| Component | % w/w |
| --- | --- |
| Non Fat Dry Milk | 1.000 |
| Calcium hydroxide | 0.22 |
| Fruit acids (citric, malic and tartaric acids) | 0.69 |
| Fruit juice concentrates | 0.87 |
| Thickeners | 0.22 |
| Carbohydrate sweeteners | 11.78 |
| Artificial & natural flavors | 0.08 |
| Food colors | 0.004 |
| Vitamins (A, C & B1) | 0.06 |
| Water | 85.05 |

-continued

| Component | % w/w |
|---|---|
| Potassium sorbate | 0.0075 |
| Natamycin | 0.0005 |
| Dimethyldicarbonate | 0.0050 |
| Total | 100.00 |

All of the ingredients (e.g., juice concentrates, milk solids, flavors, sweeteners, thickeners, etc.) are added and mixed well, except for the citric acid, potassium sorbate, natamycin, and dimethyldicarbonate, to provide the beverage. The pH of the beverage is adjusted to 4.1 with citric acid and then potassium sorbate is added and dissolved in the beverage. A stock solution of natamycin is made up in water and then added to the beverage. Dimethyldicarbonate is uniformly dispersed into the beverage just before bottling (from the point of dosing to the point of bottling and capping, the time interval is less than about 2 min.). The prepared beverage is microbially stable at ambient temperature for 21 days.

Example 2

A dilute juice beverage is prepared from the following ingredients:

| Component | % w/w |
|---|---|
| Sodium citrate | 0.09 |
| Citric acid | 0.52 |
| Vitamins (A & C) | 0.02 |
| Carbohydrate sweetener | 16.32 |
| Natural & artificial flavors | 1.14 |
| Thickeners | 0.12 |
| Oil in water emulsion | 1.66 |
| Water | 80.126 |
| Potassium sorbate | 0.015 |
| Natamycin | 0.0003 |
| Dimethyldicarbonate | 0.01 |
| Total | 100.00 |

All of the ingredients (e.g., juice concentrates, milk solids, flavors, sweeteners, thickeners, etc.) are added and mixed well, except for the citric acid, potassium sorbate, natamycin, and dimethyldicarbonate, to provide the beverage. The pH of the beverage is adjusted to 3.2 with citric acid and then potassium sorbate is added and dissolved in the beverage. A stock solution of natamycin is made up in water and then added to the beverage. Dimethyldicarbonate is uniformly dispersed into the beverage just before bottling (from the point of dosing to the point of bottling and capping, the time interval is less than about 2 min.). The prepared beverage is microbially stable at ambient temperature for 21 days.

Example 3

A tea beverage is prepared from the following ingredients:

| Component | % w/w |
|---|---|
| Natural & artificial flavors | 0.270 |
| Tea solids | 0.25 |
| HFCS 55 | 7.40 |

-continued

| Component | % w/w |
|---|---|
| Citric Acid | 0.052 |
| Sodium Citrate | 0.078 |
| Aspartame | 0.013 |
| Caramel Color | 0.08 |
| Water | 91.82 |
| Potassium sorbate | 0.015 |
| Natamycin | 0.00025 |
| Dimethyldicarbonate | 0.015 |
| Total | 100.0000 |

All of the ingredients (e.g., juice concentrates, milk solids, flavors, sweeteners, thickeners, etc.) are added and mixed well, except for the citric acid, potassium sorbate, natamycin, and dimethyldicarbonate, to provide the tea beverage. The pH of the beverage is adjusted to 4.2 with citric acid and then potassium sorbate is added and dissolved in the beverage. A stock solution of natamycin is made up in water and then added to the beverage. Dimethyldicarbonate is uniformly dispersed into the beverage just before bottling (from the point of dosing to the point of bottling and capping, the time interval is less than about 2 min.). The prepared beverage is microbially stable at ambient temperature for 21 days.

What is claimed is:

1. A beverage composition comprising:
   (a) from about 2 ppm to about 10 ppm of natamycin:
   (b) from about 30 ppm to about 150 ppm of a dialkyl dicarbonate
   (c) from about 30 ppm to about 300 ppm of a sorbate preservative;
   (d) tea; and
   (e) water.

2. The composition of claim 1 which comprises:
   (a) from about 2.5 ppm to about 5 ppm of natamycin;
   (b) from about 50 ppm to about 100 ppm of a dialkyl dicarbonate;
   (c) from about 50 ppm to about 150 ppm of a sorbate preservative.

3. The composition of claim 1 wherein the composition has a pH of from about 2.0 to about 4.5.

4. The composition of claim 3 wherein the dialkyl dicarbonate is dimethyl dicarbonate.

5. The composition of claim 4 wherein the sorbate preservative is selected from the group consisting of sorbic acid, calcium sorbate, sodium sorbate, potassium sorbate, and mixtures thereof.

6. The composition of claim 5 wherein the sorbate preservative is potassium sorbate.

7. The composition of claim 6 wherein the composition has a pH of from about 2.7 to about 4.5.

8. The composition of claim 7 comprising from about 0.01% to about 1.2% tea solids.

9. The composition of claim 8 comprising from about 0.05% to about 0.8% green tea solids.

10. The composition of claim 6 which comprises:
    (a) from about 2.5 ppm to about 5 ppm of natamycin;
    (b) from about 50 ppm to about 100 ppm of a dialkyl dicarbonate; and
    (c) from about 50 to about 150 ppm of a sorbate preservative.

* * * * *